United States Patent
Klose et al.

(10) Patent No.: US 6,538,412 B1
(45) Date of Patent: Mar. 25, 2003

(54) METHOD FOR CONTROLLING A POWER DRIVE SYSTEM

(75) Inventors: Christian Klose, Brandenburg (DE); Frank Unger-Weber, Berlin (DE)

(73) Assignee: DaimlerChrysler Rail Systems GmbH (DE)

( * ) Notice: Subject to any disclaimer, the term of this patent is extended or adjusted under 35 U.S.C. 154(b) by 0 days.

(21) Appl. No.: 09/786,533
(22) PCT Filed: Jul. 4, 2000
(86) PCT No.: PCT/EP00/06208
§ 371 (c)(1), (2), (4) Date: Apr. 12, 2001
(87) PCT Pub. No.: WO01/03965
PCT Pub. Date: Jan. 18, 2001

(30) Foreign Application Priority Data

Jul. 7, 1999 (DE) .......................... 199 31 199

(51) Int. Cl.[7] .................................. H02P 3/18
(52) U.S. Cl. .............. 318/801; 318/268; 318/269; 318/270; 318/271; 318/272; 363/34
(58) Field of Search ................ 318/800, 803, 318/801, 268–272, 362–369; 363/34

(56) References Cited

U.S. PATENT DOCUMENTS

| | | | |
|---|---|---|---|
| 3,568,016 A | * | 3/1971 | Barber .................. 310/53 |
| 3,774,095 A | * | 11/1973 | Coccia .................. 318/371 |
| 4,047,083 A | * | 9/1977 | Plunkett ................ 318/807 |
| 4,461,988 A | | 7/1984 | Plunkett ................ 318/802 |
| 4,740,738 A | * | 4/1988 | El-Antably et al. ...... 318/701 |
| 5,097,193 A | | 3/1992 | Neis et al. ............. 318/800 |
| 5,252,905 A | * | 10/1993 | Wills et al. ............. 318/807 |
| 5,698,912 A | | 12/1997 | Rasch et al. ............. 310/52 |

FOREIGN PATENT DOCUMENTS

| | | |
|---|---|---|
| AT | 10 80 63 | 11/1927 |
| DE | 40 42 377 | 12/1991 |
| DE | 44 22 275 | 12/1995 |
| DE | 44 35 351 | 3/1996 |
| DE | 197 45 849 | 4/1999 |

OTHER PUBLICATIONS

Weinmann "Spezielle Vorkehrungen bei der Vorgabe des Statorflusses für die hochdynamische Regelung eines Traktionsantriebes," ELIN–Zeitschrift, Heft 3/4:116–123 (1993) German text (partial English translation).

* cited by examiner

Primary Examiner—Rita Leykin
(74) Attorney, Agent, or Firm—Webb Ziesenheim Logsdon Orkin & Hanson, P.C.

(57) ABSTRACT

To minimize the energy required for operation of a rail vehicle, in a drive system that has an intermediate circuit converter 1 and a three-phase motor 7 fed by it, the intermediate circuit voltage in the intermediate circuit 12 and/or the magnetic flux in the drive motor 7 are optimized to correspond to the actual operating requirements, including, if necessary, the energy expenditure for the auxiliaries 9 that are provided to cool the components.

20 Claims, 5 Drawing Sheets

METHOD FOR CONTROLLING A POWER DRIVE SYSTEM

BACKGROUND OF THE INVENTION

1. Field of the Invention

This invention relates to a method as described in the introduction to claim 1.

2. Description of the Prior Art

In one method of the prior art to control a variable-speed high-power drive system (DE 44 22 275 A1), two three-phase motors are each fed by means of an associated pulse-controlled inverter from a direct-current intermediate circuit, which for its part is charged via a line current inverter from a power supply network. The drive motors have a breakdown torque that must always be greater than the torque to be applied. The drive motors are also designed for constant input power above a specified speed, which is determined by the operating point. To thereby prevent interference factors such as oscillating torques or harmonic losses, in particular in the pulse mode, and thereby reduce the electrical and mechanical load on the drive motors as well as the voltage load on the intermediate circuit inverter, in the speed range below the operating point the intermediate circuit direct-current voltage is reduced below the maximum achievable intermediate circuit voltage, and in the speed range above the operating point, starting from the reduced intermediate circuit voltage, is increased in a speed-dependent transition to the maximum intermediate circuit voltage at the maximum speed of the drive motors. The line current inverters, which can be realized in the form of d.c. choppers or four-quadrant controllers, are realized in the form of four-quadrant controllers if the drive motors in regeneration operation also generate a braking torque for the vehicle being driven. During traction operation, the motor voltages increase at a relatively constant magnetic flux from the speed zero to the operating point in a linear fashion with the speed. The maximum phase voltage is thereby achieved at the operating point. At speeds above the operating point, the motor voltage then remains constant as the flux decreases.

SUMMARY OF THE INVENTION

The object of the invention is to provide a method for controlling a variable-speed high-power drive system that includes at least one three-phase motor that is designed for constant input power above a specified speed and that is fed from an intermediate circuit converter with a variable intermediate circuit voltage, whereby the intermediate circuit converter is fed from a power line and whereby the intermediate circuit voltage in the speed range below the specified speed is reduced from its maximum value such that the intermediate circuit voltage is not reduced below a minimum voltage specified by the power supply voltage that occurs during operation, and in the speed range above the specified speed. This control method achieves a further improvement in the energy balance of the drive system.

The invention teaches transitioning the intermediate circuit voltage, in a speed dependent manner, from the reduced intermediate circuit voltage to the maximum intermediate circuit voltage at maximum speed. More specifically, above the specified speed and up to the maximum speed, and in the lower range of the torque to be generated or braked by the drive motor, the intermediate circuit voltage is kept at least approximately at the low level that it has below the specified speed up to the maximum speed.

In the invention, account is taken of the finding that in the speed range above the operating point, i.e., in the range of the full-drive setting of the inverter, at the respective speeds in the lower range of the corresponding drive torque to be applied by the drive motor or braking torque to be produced, the corresponding intermediate circuit voltage does not yet need to be increased to the increased level specified by the prior art. The invention teaches that the intermediate circuit voltage can be represented by an improved characteristics map of the form $Ud=f(M,n)$, wherein the intermediate circuit voltage U is a function of torque M and the required speed n. Accordingly, at low torque requirements, the intermediate circuit voltage can be kept largely constant or increased by only a few percent with respect to the intermediate circuit voltage that is used below the operating point, i.e., in the pulse range of the inverter. Only when the torque requirement increases above the operating point does the intermediate circuit voltage need to be increased to meet the demands placed on the drive system with regard to torque and speed to the value specified by the prior art, as a function of the increased torque requirement. The power loss of the drive system is then always minimal. The operating range in which the components of the intermediate circuit converter are supplied with reduced voltage and therefore have a longer useful life with reduced total power loss is thereby increased for speeds above the operating point.

The magnetic flux in the respective drive motor can also be controlled in an analogous manner, in addition to or also as a function of the method described above. Accordingly, at speeds above the operating point, the magnetic flux in the drive motor decreases steadily toward higher speeds, whereby the initial value corresponds to the largely constant value as indicated in the characteristics map below the operating point. The magnetic flux, always with reference to a selectable speed, is kept approximately constant in the lower range of the torque to be applied or braked by the drive motor, and is increased only when higher torques are required. The result, as for the characteristics field for the intermediate circuit voltage, is a trough-shaped characteristics field that decreases to lower values above the operating point. Overall, the magnetic flux decreases continuously toward higher speeds. The drive motor is thus operated above the operating point, starting from low torque requirements in the lower range with optimally low current values that are increased only when the torque requirement increases toward the respective maximum. The magnetic flux thereby reaches the value specified by the prior art only at higher torque requirements. The reduction of the magnetic flux is accompanied by a reduction to a minimal value of the electrical and eddy current losses, whereby at low torque requirements the magnetic flux may only be reduced to the point where it does not drop below the breakdown torque of the drive motor.

If auxiliaries are included in the drive system in the form of fans, pumps or similar devices that are used to cool the individual components such as the transformer, converter and drive motor, it is appropriate to also include their power consumption in the energy balance and to minimize this power consumption as a function of the operating conditions. For this purpose, the cooling power and thus the power supply can be controlled to a desired value below the maximum cooling value until the achievement of a predetermined, maximum allowable temperature of at least one component or part of a component that has a high thermal time constant in the drive system. Above the specified temperature, on the other hand, the cooling power is increased to the maximum value. The control of the power to the auxiliaries and thus of the cooling of the individual components is a function of the temperature of the respective components and the number of the cooling components that can be controlled independently of one another. If the cooling components cannot be controlled independently of one another, the control is exercised by selection of the maximum value.

In addition or alternatively, it can also be appropriate to control the cooling power proportional to the current power loss that occurs in the drive system on components with a low thermal time constant. This method prevents partial overheating of components or parts of components at points that are impossible or difficult to reach with thermal sensors. A more intense ventilation therefore occurs if there are sudden changes in the load in the drive system.

The energy balance can be further optimized if, below the specified maximum temperature and power loss values in the drive system, the cooling power is increased only if the total energy to be expended for the cooling is less than the sum of the additional electrical power losses that occur in the drive system if cooling is not provided. For this purpose, the current power loss of the individual components is determined from the current operating data and a determination is made, e.g. by comparison with empirically determined values, whether it is more favorable, in terms of the overall energy balance, to actuate the auxiliaries now or only later as the temperature or load of the components of the drive system increases and the heat generated by them increases compared to the cooling power currently required.

To improve the energy balance, the invention also teaches the de-excitation of the magnetic flux in the drive motor when there is no torque requirement, i.e. when a rail vehicle is coasting or stopped. This measure also eliminates the energy required for idle operation. The power required for the operation of the auxiliaries is also reduced by adjusting the cooling conditions to the reduced load requirement. This adjustment can continue to the point where individual auxiliaries can be de-actuated.

A rail vehicle operated according to the method taught by the invention and equipped with the devices necessary for such operation has a minimal-loss drive system in which the auxiliaries can also be included.

BRIEF DESCRIPTION OF THE DRAWINGS

The invention is explained in greater detail below with reference to the accompanying schematic diagrams, in which.

DESCRIPTION OF THE PREFERRED EMBODIMENTS

Figure 1:
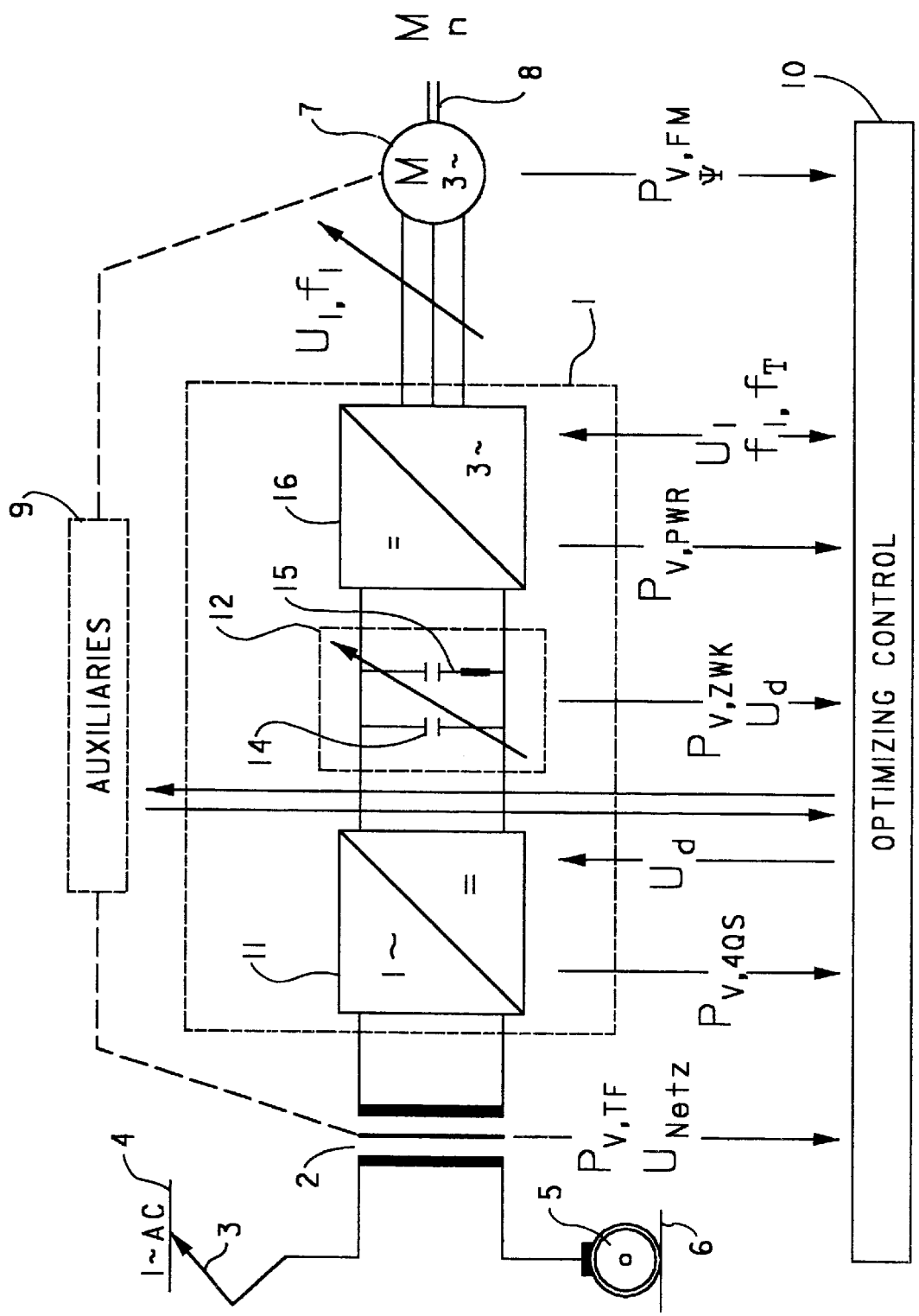
FIG. 1 is a schematic diagram of a drive system with optimization control.

As shown in FIG. 1, a control system for variable-speed operation of a high-power drive system comprises an intermediate circuit converter 1, which in this case is fed via a transformer 2 and a current collector 3 from a single-phase a.c. power supply system 4. The primary winding is thereby connected by means of at least one rail wheel 5 and at least one rail 6 to the earthed pole of the power supply system 4. The secondary winding of the transformer 2 supplies the intermediate circuit of the converter 1, the three-phase output of which feeds at least one three-phase motor 7 that functions as the drive motor for a rail vehicle. The drive motor 7 transmits a drive torque directly or via gear trains to the other rail wheel or wheels 5 of the railway vehicle. Associated with the intermediate circuit converter 1, the transformer 2 and the drive motor 7 are auxiliaries 9, which include ventilation blowers and/or fluid pump devices to cool the components of the drive system which consists of the drive motor 7, the intermediate circuit converter 1 and the transformer 2, and may also include the corresponding controls and components as necessary. There is also an optimization control 10 for the drive system overall that measures the operating data of the components of the drive system, including the auxiliaries, and after an optimization determination supplies optimization control data to these components so that the total energy is optimized as a function of the operating point of the drive system, and in particular with reference to the drive torque output by the drive motor 7 and the resulting speed and power supply line voltage. A railway vehicle equipped in this manner then operates with a minimal expenditure of energy.

The intermediate circuit converter 1 can also be fed from a diesel-electric powered generator system or from a direct current power system.

The intermediate circuit converter 1 in this case includes a line current converter 11, which is realized in the form of a direct current chopper controller for feed from a direct current line, and in the form of a four-quadrant controller for alternating current operation, so that when the drive motor 7 switches to braking operation, the electrical energy recovered can be fed back into the power supply line 4. The line rectifier 11 fed from the secondary winding of the transformer 2, feeds on the secondary side an intermediate circuit 12 that has an electrical intermediate circuit capacitor 14 and a series resonant circuit 15 connected to it in parallel. A pulse-controlled inverter 16 is connected to the intermediate circuit 12 fed with d.c. voltage and generates a variable-frequency three-phase voltage for feeding the variable-speed drive motor 7 with the necessary drive energy, and has a modulation amplitude from in the vicinity of zero to the full-drive setting. The converter modulation is characterized by the ratio of maximum possible converter output voltage to the actual converter output voltage, whereby the maximum possible output voltage is achieved at full-drive. At full-drive, the converter is working in block mode, and in the rest of the modulation range the converter is working in pulse mode.

Figure 3:
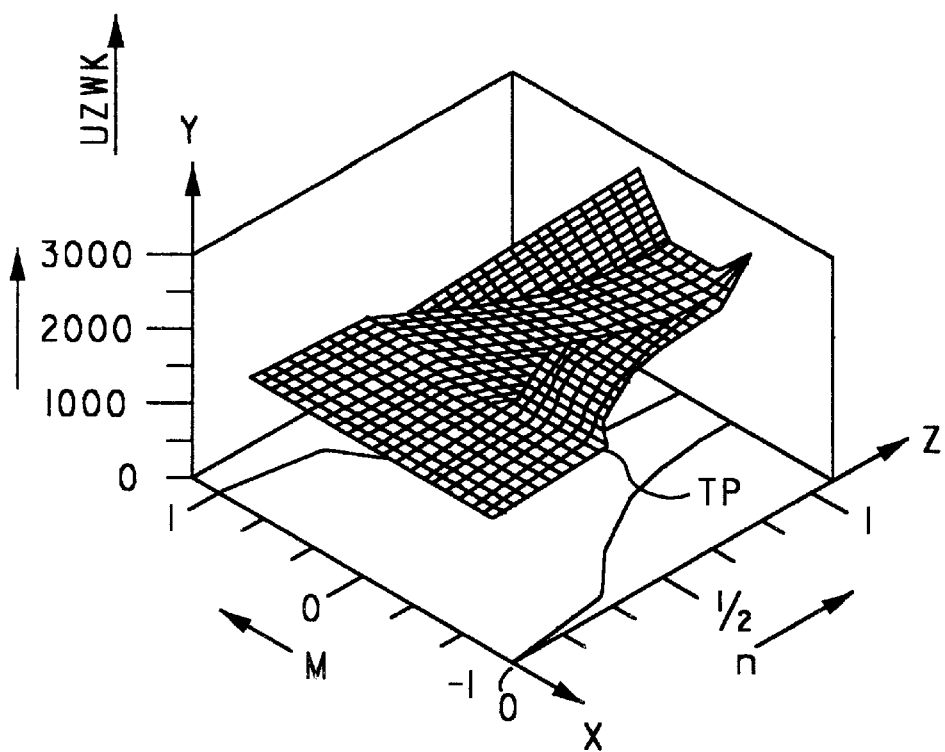
FIG. 3 is a three-dimensional graphic illustrating the curve of an intermediate circuit voltage in the intermediate circuit converter of the drive system.
Figure 4:
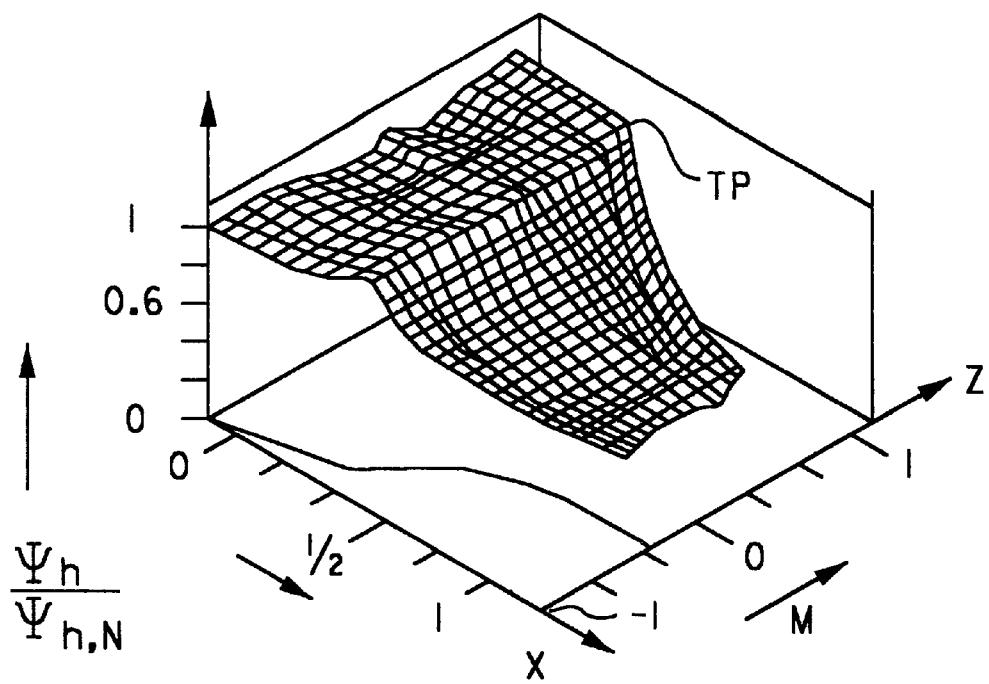
FIG. 4 is a three-dimensional graphic illustrating the curve of the magnetic flux as a function of the torque and the speed of the drive motor in the drive system.

The line rectifier 11 is controlled by the optimizing control 10 so that an optimal intermediate circuit voltage (FIG. 3) at the intermediate circuit 12 is set that is coordinated with the operating conditions of the drive motor 7. The variability of the intermediate circuit voltage is thereby indicated by the arrow (FIG. 1) that points diagonally upward. The pulse-controlled inverter 16, for its part, is also controlled by the optimizing control 10 in turn as a function of the operating requirements for the drive motor 7 and the value of the intermediate circuit voltage, such that by modifying the three-phase voltage of the magnetic flux in the drive motor 7, there is an optimal adaptation to the specified operating conditions with regard to the required torque and speed (FIG. 4). The feed voltage of the drive motor 7 is therefore also variable and is symbolized by an arrow (FIG. 1) that points diagonally upward.

Figure 2:
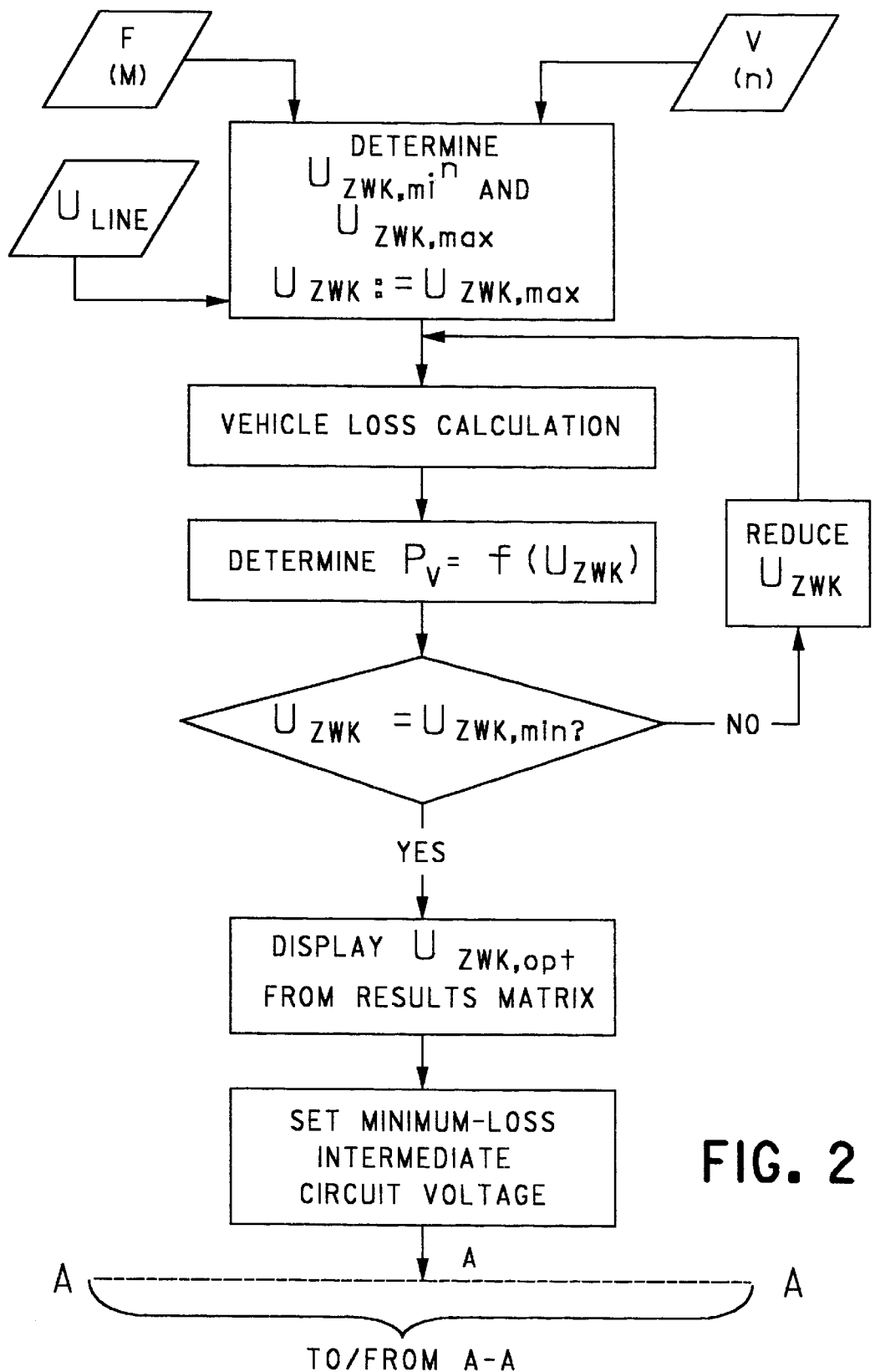
FIGS. 2 and 2a are a flow chart with steps to optimize the energy balance of the drive.
Figure 2A:
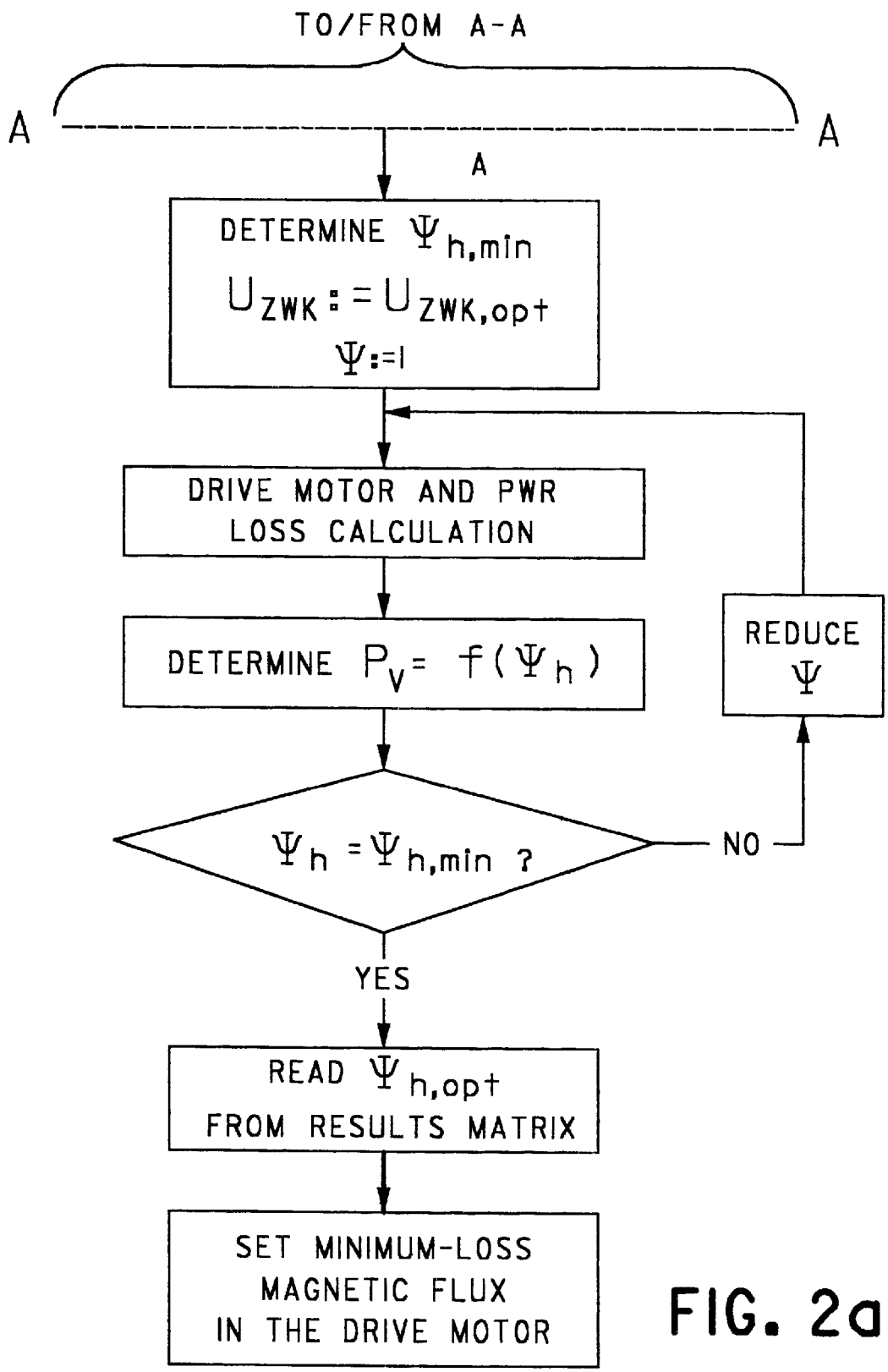
Figure 3A:
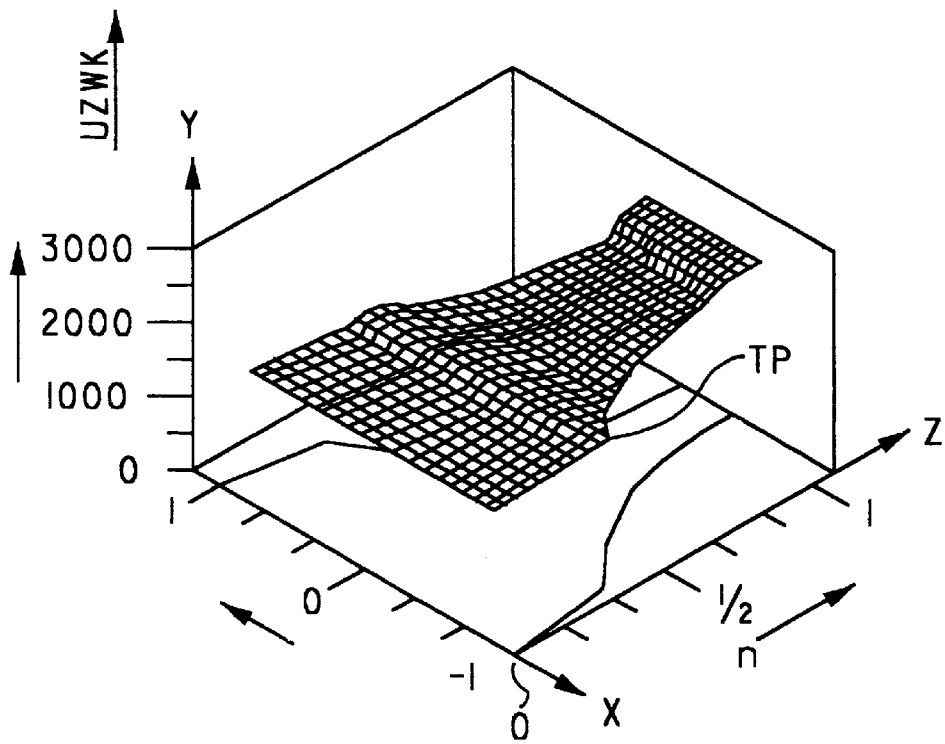
FIG. 3a is a graphic as in FIG. 3 illustrating the prior art.

To minimize the total energy requirement of the drive system, including the auxiliary operations, FIGS. 2 and 2a illustrate a method in which, from the input variables required torque M and required speed n, a minimum intermediate circuit voltage Uzwk min specified for the corresponding operating point is determined from the current line voltage, and whereby simultaneously a maximum allowable intermediate circuit voltage Uzwk max is determined for this operating point. In this case, the minimum intermediate circuit voltage must be less than or equal to the specified maximum intermediate circuit voltage. On the basis of the specified minimum intermediate circuit voltage to be generated by the line rectifier 11 in the intermediate circuit 12, the optimizing control 10 performs a loss calculation in which all the components of the drive system are taken into consideration with regard to the expected electrical losses at the operating point, whereby the intermediate circuit voltage is kept to a minimum value in the pulse mode of the converter 16. The control data derived from this calculation are stored in a results matrix, and the intermediate circuit voltage is set in the intermediate circuit 12 that results in minimal overall losses in the drive system. For the individual stages, the results are in turn stored in the results matrix with stage references. When the voltage in the intermediate circuit 12 reaches its minimum value range, then on the basis of a comparison to the control data from the results matrix stored for the individual stages, the value that results in an optimally low energy balance is output. The energy balance calculations are thereby performed for every possible operating point of the drive motor 7. The intermediate circuit voltage is kept at the minim value until the motor voltage necessary to produce the required torque of the drive motor 7 requires a higher value of the intermediate circuit voltage. FIG. 3 shows this area of the characteristics field approximately as a plane. The result of the optimization calculations for the intermediate circuit voltage is illustrated in FIG. 3, whereby the speed specified by the operating point Tp is at a value at which there is a significant change of the characteristics field. In the illustrated three-dimensional coordinate system, the torque of the drive motor for traction and braking operation is plotted on the x axis, and therefore the zero point lies in the center of the relevant area of the x axis. The intermediate circuit voltage is plotted on the vertical y axis, while the speed is plotted on the z axis. Accordingly, at speeds above the speed specified by the operating point up to the maximum speed, and thereby in the lower range of the torque to be applied or braked by the drive motor 7, the intermediate circuit voltage in the intermediate circuit 12 can be kept at least approximately at the value that is has below the specified speed, i.e., below the operating point. As the speed increases, the magnitude of the torque decreases, until such time as the intermediate circuit voltage can remain at least approximately on the level it had in the pulse-mode range of the converter. Only when the speed-related torque requirements increase further is there an increase of the intermediate circuit voltage as a function of the torque. The result is a trough-shaped characteristics field for traction and braking operation. Compared to FIG. 3, FIG. 3a shows the characteristics field and the intermediate circuit voltage used in systems of the prior art. In the figure, the intermediate circuit voltage is increased from the speed that corresponds to the operating point, regardless of the torque to be applied by the drive motor 7, up to its maximum value. On the other hand, the invention teaches that the intermediate circuit voltage is increased only in the range of higher speed requirements, and is thus also a function of the torque.

After the optimization of the intermediate circuit voltage illustrated in FIGS. 2 and 2a, the optimum magnetic flux for the drive power of the drive motor 7 is determined under the conditions specified by the torque and speed requirements also indicated in FIGS. 2 and 2a. It is thereby assumed that the instantaneous intermediate circuit voltage is not equal to the optimal intermediate circuit voltage, and the relative magnetic flux is less than 1, i.e., it can be less than the maximum magnetic flux. Starting from the maximum flux, the flux is reduced step-wise to a specified value in a computer model. The losses in the converter and drive motor are thereby determined and stored in a characteristics field as a function of the flux. The flux corresponding to the minimum loss is output as the optimal flux and transmitted to the drive system as a set point. This process is applied for each operating point of the drive system. For the optimization of the intermediate circuit voltage and of the magnetic flux, the power losses generated by the components to be taken into consideration and the corresponding parameters of the optimizing control 10 are included in the optimization process. It is thereby possible to reduce the losses in the drive system to optimize only the intermediate circuit voltage or only the magnetic flux for the drive motor, if only one of these measures is technically appropriate or feasible for cost reasons.

FIG. 4 shows the characteristics field for the optimized control of the magnetic flux in the drive motor 7, once again in the form of a three-dimensional characteristics field, whereby the speed is plotted on the x axis, the normalized magnetic flux is plotted on the y axis and the required drive or braking torque of the drive motor 7 is plotted on the z axis. The zero point for the torque is thereby once again in the middle area of the z axis, whereby positive torques stand for drive energy and negative torques for braking energy. An energy-optimized operation accordingly results at full modulation of the converter if there is a more severe reduction of the magnetic flux toward the maximum speed in the lower range of the torque requirement than in the upper range of the torque requirement. In the pulse mode of the converter, accordingly, and as a function of the operating point, there is a minimal power loss as a result of the reduction of the magnetic flux. At full modulation of the converter, i.e. in block mode, the flux can no longer be influenced by the converter. In this case, the flux results from the intermediate circuit voltage, which has already been optimized as a function of the operating point. As a result of the optimization of the magnetic flux, the losses generated in the drive motor 7 are reduced, both in the stator winding and in the core.

Figure 4A:
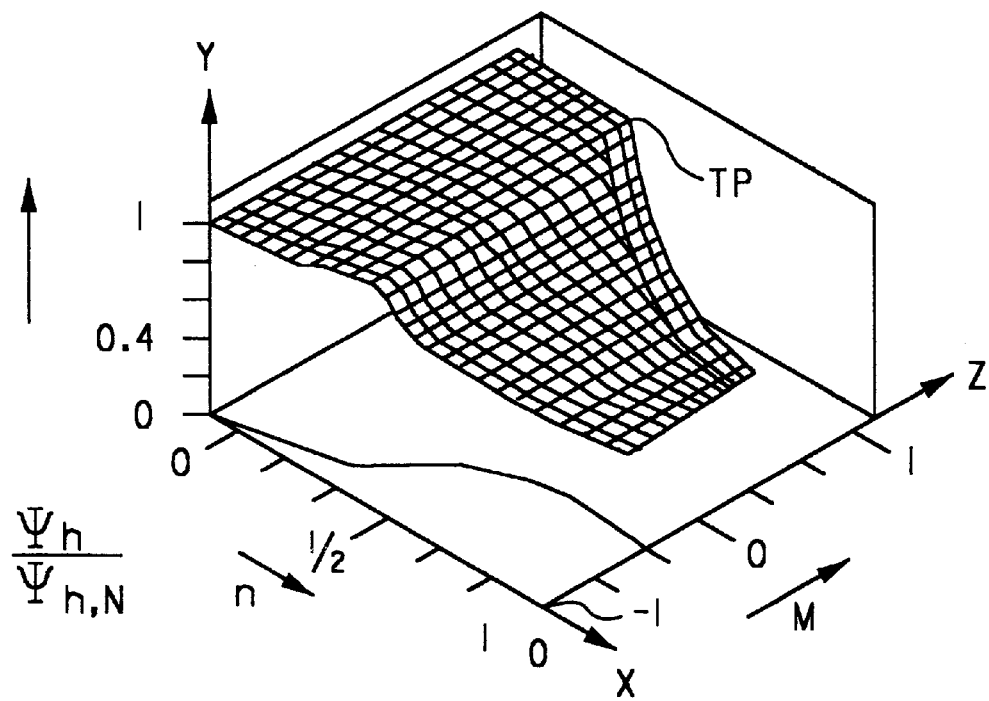
FIG. 4a is a graphic as in FIG. 4 illustrating the prior art.

FIG. 4a shows the characteristics field for the magnetic flux as it is realized by devices of the prior art. Here, accordingly, the magnetic flux is controlled only as a function of the speed of the drive motor and independently of the required torque. By contrast, in the optimized method illustrated in FIG. 4, by reducing the magnetic flux in the lower load range of the drive motor, a reduction of the magnetic flux is achieved in a large part of the lower torque characteristics field and thus a reduction of the power losses.

The auxiliaries associated with the drive system to dissipate the power loss that occurs in the components are controlled so that until a specified temperature of at least one component or part of a component that has a high thermal time constant is reached, the cooling power is kept to a severely reduced value which is far below the maximum cooling power. A component with a high thermal time constant is, for example, the oil-cooled transfer or the drive motor with the core and other heavy individual parts. Only above the specified temperature, as a function of the current temperature of at least one of these components or part of a component is the cooling power increased up to its maximum value as a function of the temperature. Additionally or alternatively, the cooling power can also be controlled proportional to the current power losses occurring in the drive system in components that have a low thermal time constant. Components that have a low thermal time constant include, for example, the windings of the drive motor, the components of the power converter, braking resistances etc. In the consideration of the overall energy balance it is thereby appropriate, below the specified maximum temperature and power loss values in the drive system, to increase the cooling power only when the energy that must be expended for the cooling is less than the sum of the electrical energy losses in the drive system that will occur if cooling is not applied.

If there are other individual components of the drive system, e.g. a fluid cooling system associated with the oil transformer or a ventilation system associated with the drive motor and possibly other components, it may be appropriate to control the cooling power of these individual auxiliaries selectively as a function of the temperature and/or of the load of the associated components, and thereby perform the optimization calculation and realize the resulting control measures individually.

For the energy balance, it is also advantageous if the magnetic flux in the drive motor 7 is de-energized when no torque is required, and therefore the magnetic flux or the feed voltage of the drive motor 7 is modulated toward zero. When the railway vehicle is coasting or stationary, no energy is then consumed for the idling of the drive motor. The cooling and thus the power to the auxiliaries are thereby adjusted to the reduced load, down to the point where individual cooling units can be turned off completely, along with the auxiliaries converter that is provided to supply them with power.

What is claimed is:

1. A method to control a variable-speed high-power drive system that comprises at least one three-phase motor that is designed for constant input power above a specified speed and is fed from an intermediate circuit converter with a variable intermediate circuit voltage, whereby the intermediate circuit converter is fed from a power line and whereby the intermediate circuit voltage in the speed range below the specified speed is reduced from its maximum value such that the intermediate circuit voltage is not reduced below a minimum voltage specified by the power supply voltage that occurs during operation, the method comprising the steps of:

(a) transitioning the intermediate circuit voltage, in a speed dependent manner, from the reduced intermediate circuit voltage to the maximum intermediate circuit voltage in the speed range above the specified speed to a maximum speed; and (b) above the specified speed and up to the maximum speed, and thereby in the lower range of the torque to be generated or braked by the drive motor, keeping the intermediate circuit voltage at least approximately at the low level that it has below the specified speed up to the maximum speed.

2. The method as claimed in claim 1, wherein the intermediate circuit voltage at each operating point is set to achieve the minimum overall power loss of the vehicle.

3. The method as claimed in claim 2, wherein a magnetic flux in the drive motor during field weakening is steadily reduced toward higher speeds, and results from the intermediate circuit voltage, whereby the magnetic flux in a pulse mode of the inverter is reduced as a function of the torque to be applied or braked by the drive motor, so that the minimum sum of the power losses in the inverter and drive motor results.

4. The method as claimed in claim 2, wherein the drive system is cooled by means of auxiliary operations such as pumps and ventilators, whereby to achieve a specified temperature of at least one component or a part of said component in the drive system that has a high thermal time constant, the cooling power is modulated to a sharply reduced value that is far below the maximum cooling power, and above the specified temperature is increased to the maximum cooling power as a function of the current temperature of at least one component or a part of said component.

5. The method as claimed in claim 2, wherein the cooling power is controlled proportional to the power loss currently occurring in the drive system in components that have a low thermal time constant.

6. The method as claimed in claim 3, wherein the drive system is cooled by means of auxiliary operations such as pumps and ventilators, whereby to achieve a specified temperature of at least one component or a part of said component in the drive system that has a high thermal time constant, the cooling power is modulated to a sharply reduced value that is far below the maximum cooling power, and above the specified temperature is increased to the maximum cooling power as a function of the current temperature of at least one component or a part of said component.

7. The method as claimed in claim 6, wherein the cooling power is controlled proportional to the power loss currently occurring in the drive system in components that have a low thermal time constant.

8. The method as claimed in claim 3, wherein the cooling power is controlled proportional to the power loss currently occurring in the drive system in components that have a low thermal time constant.

9. The method as claimed in claim 1, wherein a magnetic flux in the drive motor during field weakening is steadily reduced toward higher speeds, and results from the intermediate circuit voltage, whereby the magnetic flux in a pulse mode of the inverter is reduced as a function of the torque to be applied or braked by the drive motor, so that the minimum sum of the power losses in the inverter and drive motor results.

10. The method as claimed in claim 9, wherein the drive system is cooled by means of auxiliary operations such as pumps and ventilators, whereby to achieve a specified temperature of at least one component or a part of said component in the drive system that has a high thermal time constant, the cooling power is modulated to a sharply reduced value that is far below the maximum cooling power, and above the specified temperature is increased to the maximum cooling power as a function of the current temperature of at least one component or a part of said component.

11. The method as claimed in claim 9, wherein the cooling power is controlled proportional to the power loss currently occurring in the drive system in components that have a low thermal time constant.

12. The method as claimed in claim 1, wherein the drive system is cooled by means of auxiliary operations such as pumps and ventilators, whereby to achieve a specified temperature of at least one component or a part of said component in the drive system that has a high thermal time constant, the cooling power is modulated to a sharply reduced value that is far below the maximum cooling power, and above the specified temperature is increased to the maximum cooling power as a function of the current temperature of at least one component or a part of said component.

13. The method as claimed in claim 12, wherein below specified maximum temperature and power loss values in the drive system, the cooling power is increased only if the total additional energy that must be expended for the cooling is less than the sum of the additional electrical energy losses that occur in the drive system in the absence of cooling.

14. The method as claimed in claim 12, wherein individual components of the drive system have their own associated auxiliary operations for cooling, and that the cooling power of these cooling operations is controlled selectively as a function of the temperature and/or load of the corresponding component.

15. The method as claimed in claim 12, wherein the cooling power is controlled proportional to the power loss currently occurring in the drive system in components that have a low thermal time constant.

16. The method as claimed in claim 1, wherein the cooling power is controlled proportional to the power loss currently occurring in the drive system in components that have a low thermal time constant.

17. The method as claimed in claim 16, wherein below specified maximum temperature and power loss values in the drive system, the cooling power is increased only if the total additional energy that must be expended for the cooling is less than the sum of the additional electrical energy losses that occur in the drive system in the absence of cooling.

18. The method as claimed in claim 1, wherein a magnetic flux in the drive motor is de-energized in the absence of a torque requirement, and the power converter and inverter are de-actuated.

19. The method as claimed in claim 18, wherein the auxiliary operations used for cooling are adjusted to the varying load requirements, to the point where they can be de-actuated completely.

20. A control device to control a variable-speed high-power drive system comprising at least one three-phase motor that is designed for constant input power above a specified speed and is fed from an intermediate circuit converter with a variable intermediate circuit voltage, whereby the intermediate circuit converter is fed from a power line and whereby the intermediate circuit voltage in the speed range below the specified speed is reduced from its maximum value such that the intermediate circuit voltage is not reduced below a minimum voltage specified by the power supply voltage (contact line voltage) that occurs during operation, and in the speed range above the specified speed, starting from the reduced intermediate circuit voltage, there is a speed-dependent transition to the maximum intermediate circuit voltage at maximum speed, wherein, in the drive system, the intermediate circuit voltage at speeds of the drive motor in a block mode of the power inverter and thereby in the lower range of the torque to be applied or braked by the drive motor is controlled at least approximately to a value that corresponds to the intermediate circuit voltage in the intermediate circuit below the specified speed of the drive motor, and is set so that at each operating point, the result is a minimum overall power loss for the overall drive system.

* * * * *